(12) United States Patent
Wyman et al.

(10) Patent No.: US 6,187,353 B1
(45) Date of Patent: Feb. 13, 2001

(54) HOT AIR POPCORN MACHINE

(75) Inventors: Melvin J. Wyman, Venice; Roger C. Young, Yorba Linda; Bobby Dillon, Riverside; Dwight A. Moody, Santa Ana, all of CA (US); Vernon L. M. Brokke, Baltimore, MD (US)

(73) Assignee: Pop-N-Go, Inc., Whittier, CA (US)

( * ) Notice: Under 35 U.S.C. 154(b), the term of this patent shall be extended for 0 days.

(21) Appl. No.: 09/529,110
(22) PCT Filed: Nov. 2, 1998
(86) PCT No.: PCT/US98/23305
§ 371 Date: Apr. 7, 2000
§ 102(e) Date: Apr. 7, 2000
(87) PCT Pub. No.: WO99/23895
PCT Pub. Date: May 20, 1999

Related U.S. Application Data
(60) Provisional application No. 60/064,933, filed on Nov. 7, 1997.

(51) Int. Cl.[7] ................ A23L 1/00; A23L 1/18
(52) U.S. Cl. ............ 426/233; 99/323.5; 99/323.7; 426/438; 426/450; 426/523
(58) Field of Search .......... 99/286, 323.5–323.9, 99/331–334, 337, 338, 340, 473–476, 468, 486; 126/21 A, 369; 34/233, 225, 360, 368, 392, 394, 576, 594, 494, 499; 219/385, 386, 389, 400, 502; 426/231–233, 438, 450, 523

(56) References Cited

U.S. PATENT DOCUMENTS

| | | | | |
|---|---|---|---|---|
| 4,196,342 | * | 4/1980 | Chailloux | 219/385 |
| 4,307,657 | * | 12/1981 | Avery | 99/323.7 |
| 4,438,682 | * | 3/1984 | King et al. | 99/323.7 |
| 4,484,064 | * | 11/1984 | Murray | 219/400 |
| 4,494,314 | * | 1/1985 | Gell, Jr. | 99/323.7 |
| 4,860,461 | * | 8/1989 | Tamaki et al. | 99/286 X |
| 5,020,688 | * | 6/1991 | Power | 99/323.7 |
| 5,269,072 | * | 12/1993 | Waligorski | 34/594 |
| 5,501,139 | * | 3/1996 | Lee | 99/323.9 |
| 5,564,331 | * | 10/1996 | Song | 99/469 |
| 5,609,097 | * | 3/1997 | Newnan | 99/483 X |
| 5,638,607 | * | 6/1997 | Lemme et al. | 219/385 X |
| 5,735,194 | * | 4/1998 | Cochran | 99/483 |

* cited by examiner

Primary Examiner—Timothy F. Simone
(74) Attorney, Agent, or Firm—Freilich, Hornbaker & Rosen (57) ABSTRACT

A hot air popcorn machine including a programmable control system for precisely controlling various operating parameters including air flow and air temperature to enable the machine to consistently produce high quality popcorn in a low maintenance environment, e.g., a free-standing vending machine.

13 Claims, 6 Drawing Sheets

HOT AIR POPCORN MACHINE

This application is a 371 of PCT/US98/23,305, filed Nov. 2, 1998 which claims the benefit of U.S. Provisional Application No. 60/064,933, filed Nov. 7, 1997.

BACKGROUND OF THE INVENTION

The present invention is directed to apparatus for preparing popcorn via a closed-loop hot air cooking process and more particularly to such an apparatus suitable for use as a low maintenance, free-standing vending machine.

Popcorn vending machines are well known in the art and are discussed in various prior patents including, for example, U.S. Pat. Nos. 4,307,657 and 5,020,688, as well as the references cited therein.

The use of hot air to "cook" or "pop" hard popcorn kernels is well known. The quality of the end product, i.e., the popcorn, is dependent upon several factors including the temperature of the air used for cooking and the cooking time duration.

SUMMARY OF THE INVENTION

The present invention is directed to a hot air popcorn machine including a programmable control system for precisely controlling various operating parameters including air flow and air temperature to enable the machine to consistently produce high quality popcorn in a low maintenance environment, e.g., a free-standing vending machine.

A machine in accordance with the invention includes a reservoir for hard kernel inventory; a cooking chamber; a kernel metering device, e.g., an auger, for delivering hard kernels to the cooking chamber; a heater; a blower for delivering heated air to the cooking chamber; an output container for receiving popped kernels, i.e., popcorn, from the cooking chamber; and a programmable control system for controlling operation of the machine. In use, the control system responds to a "start" event, e.g., a user depositing money into a coin/currency reader, to initiate an operational cycle preferably comprised of the following sequential phases: (1) preheat, (2) kernel delivery, (3) cook (including flavoring dispensing), and (4) kernel purge.

A preferred control system in accordance with the invention incorporates a programmed controller, e.g., a microprocessor based microcomputer, and a feedback loop for controlling air flow to the cooking chamber. More particularly, the controller responds to an air flow sensor to control the air flow to the cooking chamber to conform to a set point defined by a programmed or calculated air flow profile. Closed loop, i.e., feedback, control of air flow compensates for variations in components (attributable to either manufacture and/or aging) and environment (e.g., voltage and air temperature variations). Various techniques can be used to control air flow such as blower speed control and/or air baffle control.

In accordance with a preferred embodiment, the speed of a blower motor is controlled by duty cycle variation; e.g., by use of a pulse density modulation technique with the controller applying fixed duration pulses at a rate appropriate to establish the desired set point air flow.

In accordance with a further aspect of a preferred embodiment, the blower functions not only to deliver heated air to the cooking chamber for cooking but additionally functions to propel each popped kernel through an output chute to the output container. Still further, the blower is selectively controlled to purge any kernels from the cooking chamber toward the end of each operational cycle.

A control system in accordance with the invention preferably also incorporates a closed loop heater control. That is, a temperature sensor is preferably provided to measure the temperature in a heat chamber to allow the controller to control the heater to maintain air flow temperature at a target set point.

In accordance with a further aspect of a preferred embodiment, an optical sensor is provided for counting popped kernels delivered out of the cooking chamber through the output chute. The popped kernel count can be selectively used by the controller to time the actuation of a pump for delivering butter flavoring, e.g., butter, to the output container.

When used as a vending machine, apparatus in accordance with the invention is preferably configured with a transparent housing so that a user can readily watch the popcorn preparation process; i.e., the steps of metering the hard kernels into the cooking chamber, the popping of the kernels, the delivery of the popped kernels through the chute to the output container, and the dispensing of butter flavoring into the container. An alphanumeric visual display is preferably carried by the housing for presenting informative (and/or entertaining) messages to the user such as instructions and feedback. Further, the housing is preferably adorned with attractive eye-catching lighting such as multicolor neon lights so that the machine will afford a user an entertaining experience in addition to providing a high quality popcorn product.

DETAILED DESCRIPTION

Figure 1:
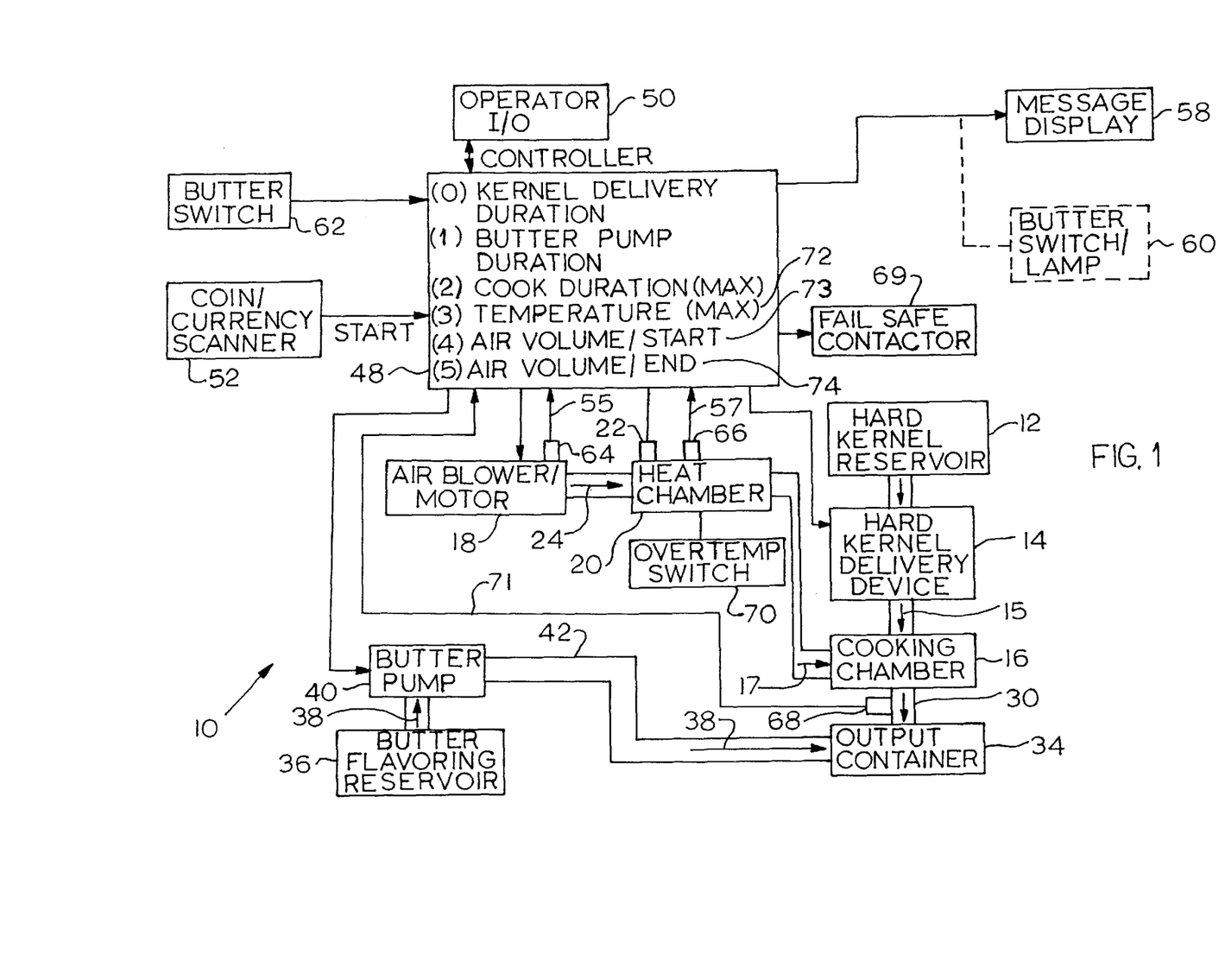
FIG. 1 is a functional block diagram of a preferred system in accordance with the present invention depicting a microprocessor based controller coupled to the primary functional elements of a preferred machine embodiment.

Attention is now directed to FIG. 1 which depicts a functional block diagram of a hot air popcorn machine 10 in accordance with the present invention. The machine 10 includes a reservoir 12 for storing an inventory of hard popcorn kernels. In a typical application of the invention as a vending machine, the reservoir 12 will accommodate a volume of hard kernels sufficient to produce two-hundred or more large cups (e.g., 46 ounces) of popcorn. The machine 10 also includes a metering device 14, e.g., an auger, actuatable to deliver a unit volume of hard corn kernels 15 from the reservoir 12 to a cooking chamber 16.

The kernels 15 delivered to the cooking chamber 16 are then cooked, i.e., popped, by a heated air flow 17 supplied thereto from an air blower/motor 18 via a heat chamber 20. The heat chamber 20 is heated by an electric heater 22 so that ambient air 24 blown through the heat chamber 20 emerges as heated air 17 for application to the hard kernels in the cooking chamber 16. After the kernels pop in the cooking chamber 16, they are preferably blown by the air flow 17 through output chute 30 to an output container 34, e.g., a removable cardboard or plastic cup.

The machine 10 further includes a reservoir 36 for storing flavoring 38, typically butter. The flavoring 38 can be drawn by an actuatable pump 40 from the reservoir 36 for dispensing via tube 42 directly into the output container 34.

The functional elements thus far described are controlled in accordance with the intention by a programmed microprocessor based controller 48. The controller 48 is capable of being programmed via an operator input/output (I/O) device 50. The operator I/O device 50 is intended to be available to a machine operator, i.e., a person responsible for installation and/or maintenance of the machine. As used herein, the term "operator" is to be distinguished from the term "user" which will be used to refer to a person who uses the machine 10 to purchase or obtain a cup of popcorn.

Figure 2:
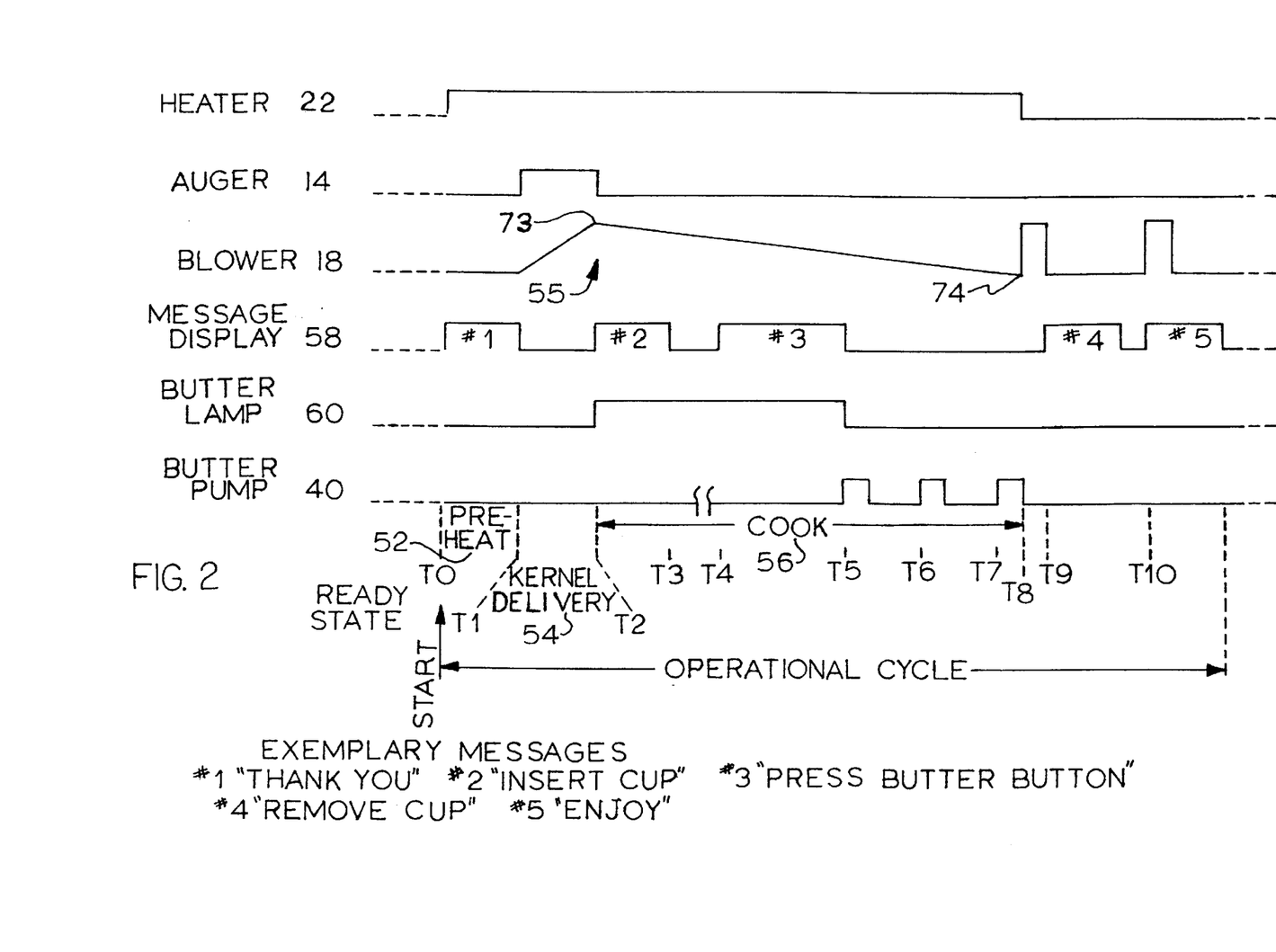
FIG. 2 is a timing chart generally depicting the operation of the system of FIG. 1.

In accordance with a preferred embodiment of the invention, the controller 48 is programmed with multiple operating parameter values which are used to control sequential phases of an operational cycle of the apparatus. FIG. 2 depicts a typical operational cycle and the sequential phases occurring therein. The cycle is initiated by a "START" event (at time $T_0$) which, in a vending machine environment, will typically be produced by a user depositing the correct amount of money into the coin/currency scanner 52. The START event initiates a preheat phase 53 and causes the controller 48 to actuate the heater 22 to start warming the heat chamber 20. At time $T_1$, the controller 48 actuates the hard kernel delivery device 14 and the air blower/motor 18. The delivery device 14, e.g., an auger, meters a portion of hard kernels to the cooking chamber by time $T_2$. During this $T_1$–$T_2$ interval (kernel delivery phase 54), the blower/motor speed is ramped up to a Start Air Flow Rate (corresponding to a stored parameter value to be discussed hereinafter) to follow a first portion of stored airflow profile 55. The slope of the ramp is selected to provide sufficient air flow to slightly agitate the hard kernels 15 arriving in the cooking chamber 16 but low enough to allow the temperature in the chamber to rise toward cooking temperature.

With the kernels 15 in the cooking chamber 16 and the heater 22 and blower/motor 18 actuated, cook phase 56 is initiated at time $T_2$. The cook phase 56 extends to time $T_8$, the duration $T_2$–$T_8$ being determined by the controller 48 in response to a stored or calculated Cook Phase Duration parameter value, to be discussed hereinafter. During the cook phase (i.e., $T_2$–$T_8$), the heater is maintained at a temperature corresponding to a stored parameter value and the blower/motor speed is preferably ramped down to an End Air Flow Rate in accordance with a second portion of the stored or calculated air flow profile 55. At the beginning of the cook phase, the controller 48 preferably causes the alphanumeric message display 58 to instruct the user to "insert cup" and illuminates a butter switch lamp 60 to invite the user to actuate a butter command switch 62. If switch 62 is actuated, then at some later time, e.g., $T_5$, $T_6$, $T_7$, the controller 48 actuates pump 40 to dispense butter flavoring into the output container 34. At the end of the cook phase $T_8$, the controller 48 preferably pulses the blower/motor 18 to increase air flow to blow any remaining popped kernels from the cooking chamber 16 into the output container 34. Additionally, via the display 58, the user at time $T_9$ is instructed to remove the output cup. At a subsequent time $T_{10}$ in the operational cycle, the blower/motor 18 is pulsed again so, in the unlikely event any unpopped kernels remain in the cooking chamber 16, they will be blown out to a waste receptacle.

Figure 3A:
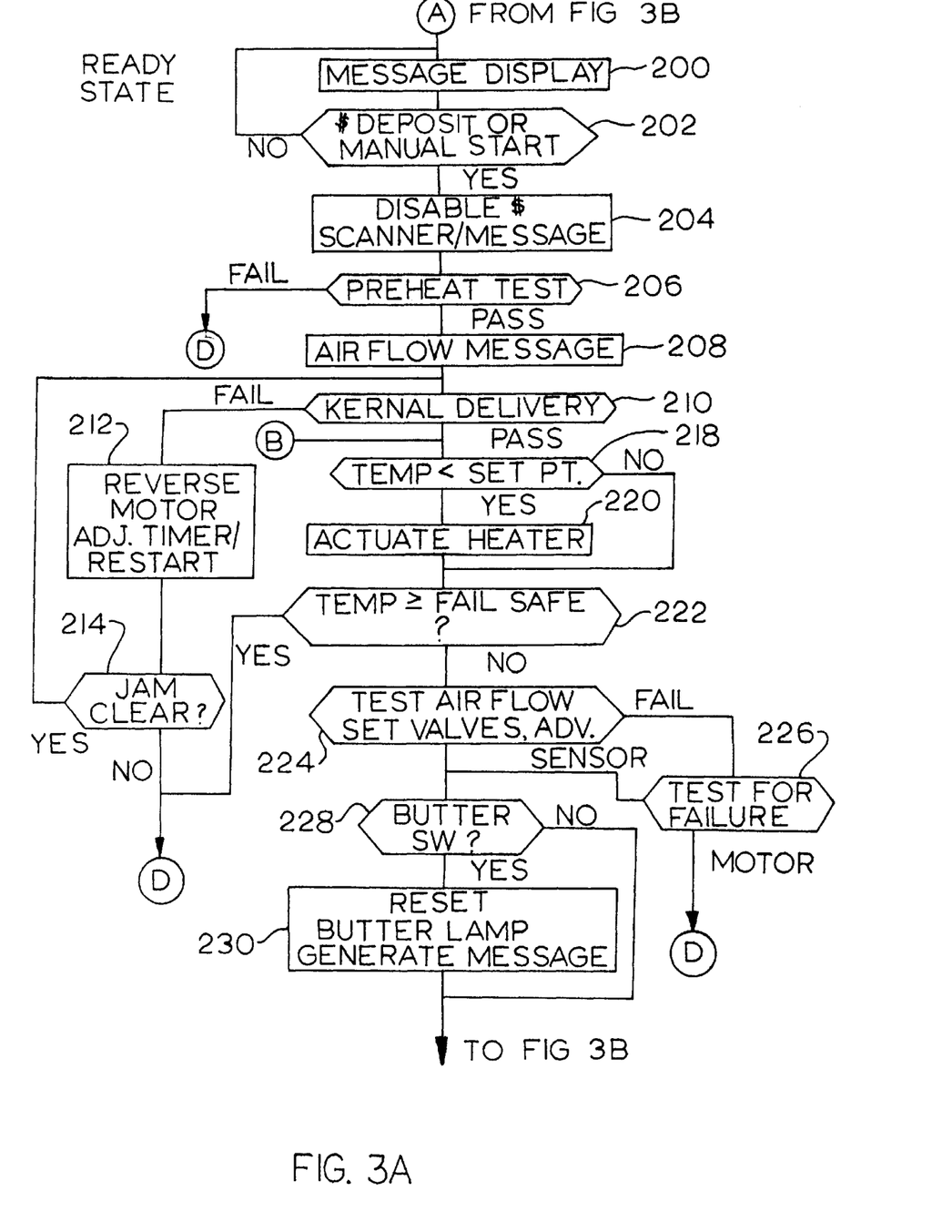
FIGS. 3A, 3B is a flow chart generally describing the operation of the system of FIG. 1.
Figure 3B:
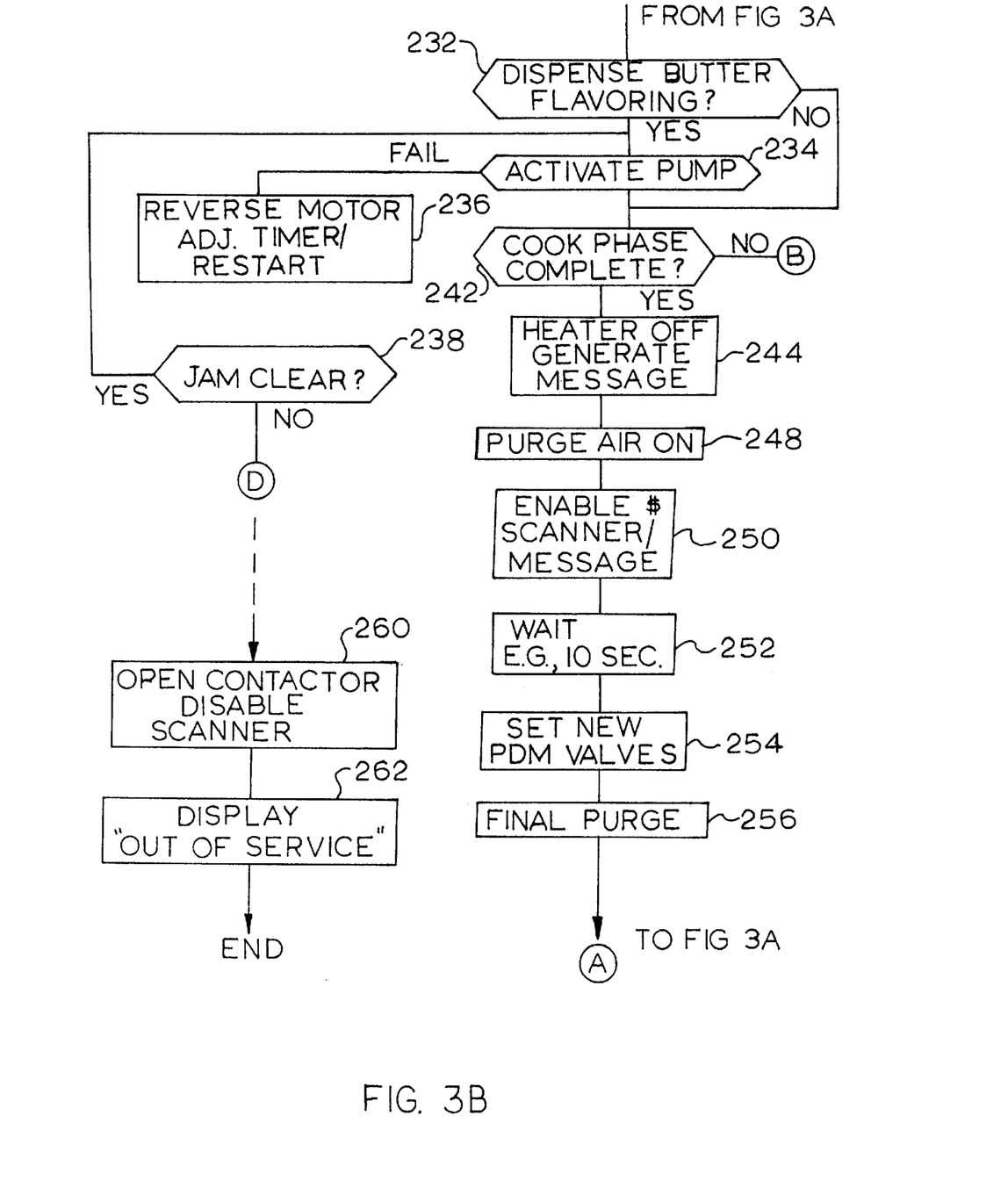

The controller 48 controls the various functional elements thus far described in accordance with the stored program represented in FIG. 3, stored operating parameter values listed in FIG. 1, and feedback information provided by air flow sensor 64, temperature sensor 66, and optical sensor 68, all schematically shown in FIG. 1.

The air flow sensor 64 produces an air flow signal 65 which indicates the air flow rate produced by blower/motor 18. This information is used by the controller 48 to either increase or reduce the blower/motor duty cycle to match the measured flow rate to the flow rate setpoint determined by the controller.

The temperature sensor 66 produces an air temperature signal 67 which indicates the temperature in the heat chamber 20. This information is compared by the controller 48 with a target setpoint. If the measured temperature is too high, the controller terminates current to the heater until the temperature falls below the setpoint. If the controller is unable to bring the temperature below a fail-safe level, a fail-safe contactor 69 is opened to remove power to the heater 22 and to cause the display 58 to show an "out of service" message. An over temperature switch 70 with a predetermined temperature preset, and separate from the controller 48, is mechanically attached to the heat chamber 20. In case of controller 48 failure, over temperature switch 70 cuts power to the contactor 72 and causes display 58 to show an "out of service" message.

The optical sensor 68 produces a popped kernel count signal 71 corresponding to the amount of popped kernels blown through the chute 30 to the output container 34. The popped kernel count signal 69 is preferably used by the controller 48 to time the actuation of butter pump 40 for delivering butter flavoring, e.g., butter, to the output container 34.

Various operating parameter values are field programmable into the controller 48 via the operator I/O device 50. Although these values are typically set at the time of manufacture (e.g., in ROM or EPROM within the controller 48), the I/O device 50 enables them to be adjusted on site to compensate for component aging and/or environmental variation, e.g., by storing operating parameters within RAM or EEPROM located within or associated with the controller 48 (typically a microcomputer). In accordance with the preferred embodiment, the following operator parameters are field programmable:

| PARAMETER | NAME/FUNCTION |
| --- | --- |
| [0] | Kernel Delivery Duration |
| [1] | Butter Pump Duration |
| [2] | Cook Phase Duration |
| [3] | Cook Temperature Maximum |
| [4] | Start Air Flow Rate |
| [5] | End Air Flow Rate |

The controller 48 typically stores a value V for each parameter. For example, where Parameter [0] defines the Kernel Delivery Duration, if the variable V[0]=16, the kernel delivery device 14 is turned on for sixteen time increments. In a preferred embodiment, each Parameter [0] increment equals 0.25 seconds so that V[0]=16 designates that the kernel delivery device should be turned ON for four seconds. This duration determines the size of a unit volume of kernels 15 delivered to the cooking chamber 16 to produce a single popcorn portion.

Parameter [1] defines the Butter Pump Duration. As an example, assuming 0.25 second increments, when V[1]=22, pump 40 will be turned ON for five and one-half seconds.

The larger the programmed value, the more butter flavoring 38 will be dispensed into the output container 34. The butter pump ON time is preferably comprised of two or more noncontiguous subintervals to better distribute the flavoring over kernels delivered to the output container 34. The butter pump ON time preferably should not exceed one-half of the cook phase duration.

Parameter [2] defines the Cook Phase Duration. As an example, assuming one second increments, when V[2]=150, the cook phase duration is set to 150 seconds, i.e., 2.5 minutes, independent of preheat, kernel delivery and purge phases.

Parameter [3] defines the Cook Temperature Maximum, the temperature setpoint 72. As an example, the value V[3]=110 refers to the raw readout from the heat chamber temperature sensor 66. The larger the number, the higher the temperature that can be developed in the heat chamber. It is parenthetically pointed out that although there is an optimum theoretical temperature at which hard popcorn kernels will pop, each different heat chamber may have slightly different characteristics so that it is desirable to be able to define this parameter value differently for each particular heat chamber.

Parameter [4] defines the Start Air Flow Rate (a first air flow setpoint 73) at the start of the cook phase, $T_2$. As an example, the value V[4]=225 defines the speed which the blower/motor 18 should reach at time $T_2$. In a preferred embodiment, the blower/motor speed is controlled by a pulse density modulation technique and the exemplary number 225 defines a 3.33% duty cycle (where duty cycle=(255−X)$^{-1}$ and a value of 255 defines a 100% duty cycle).

Parameter [5] defines the End Air Flow Rate (a second air flow setpoint 74) at the end of the cook phase $T_8$. As an example, the value V[5]=113 defines a 0.7% duty cycle for the blower/motor 18. The number is preferably selected to be as low as possible while still providing sufficient flow to blow popped kernels out of the cooking chamber into the output chute 30.

Attention is now called to FIG. 3 which illustrates a flow chart describing an exemplary program executed by controller 48. When in the READY state awaiting a START event, the system will continue to loop through blocks 200 and 202. Block 200 causes the alphanumeric display 58 to generate attractive, entertaining and instructive messages, e.g., "insert one dollar". Block 202 determines whether the coin/currency scanner 52 has accepted a correct deposit from a user. If NO, then operation loops back to block 200. If YES, the message display electronics producing the message "insert one dollar" is disabled (block 204) and operation proceeds to block 206 which executes a preheat test. If the test fails then operation proceeds to point D in the flow chart of FIG. 3, to be discussed hereinafter. If the preheat test succeeds, operation proceeds to block 208 which causes the display 58 to tell the user that air flow is being initiated. Subsequently block 210 is executed which actuates the kernel delivery device 14. If kernel delivery fails, block 212 is executed which attempts to free the jam in the delivery device 14 by, for example, reversing the auger motor. Block 214 determines whether the jam has cleared. If YES operation returns to block 210 to effect kernel delivery. If the auger has not recovered from the jam, then operation proceeds from block 214 to point D in the flow chart to be discussed hereinafter.

Assuming a successful kernel delivery by device 14 to cooking chamber 16, operation proceeds from block 210 to block 218 which determines whether the temperature in the heat chamber 20 is less than the temperature set point 70. If YES, then operation proceed to block 220 which turns the heater 22 ON. If NO, operation proceeds to block 222 which queries whether the temperature is equal to or greater than a fail safe temperature. If YES, operation proceeds to point D of the flow chart. If NO, normal operation proceeds from block 222 to block 224. Block 224 tests the air flow and adjusts the pulse density modulation to bring the air flow to the first desired set point 72. If the air flow test fails, then operation proceeds to block 226 which executes a test for motor or sensor failure. If motor failure is determined, operation proceeds to point D of the flow chart. If the test in block 226 determines sensor failure, operation proceeds to point D of the flow chart. If no sensor failure was detected, operation proceeds to block 228 which determines whether the butter switch 62 has been pressed. If YES, then operation proceeds to block 230 which resets the butter lamp and perhaps generates an acknowledgment message on the alphanumeric display 58. If decision block 228 indicates NO, then the operation bypasses block 230.

Block 232 is next executed. If the butter switch 62 had not been pressed, then operation proceeds out of block 232 along the NO path bypassing block 234. If block 232 indicates YES then operation proceeds to block 234 which actuates butter pump 40. Block 234 tests for butter pump failure and if failure occurs, operation loops to block 236 which attempts to clear the pump failure by reversing the pump motor. Block 238 tests to determine if the jam has been cleared. If YES, operation loops back to block 234. If the block 238 test indicates failure, then operation proceeds to point D. It will be recalled that prior failures in the flow chart also lead to point D. Execution from point D will be discussed hereinafter.

Proceeding from a successful pump operation in block 234, block 242 is executed which looks to see if the cook phase is finished by monitoring output 69 of sensor 68. If NO, operation proceeds to point B in the flow chart leading to block 218. If YES, operation proceeds to block 244 which turns the heater OFF. Operation then proceeds through block 248 to execute the initial air purge operation at time $T_8$ and block 250 which enables the currency scanner 52 and displays a new message on display 58, e.g., a company logo and/or operating information such as "insert one dollar". Block 252 introduces a WAIT state and block 254 reestablishes new pulse density modulation values. Block 256 then causes the second air purge at time $T_{10}$ which completes the operational cycle and returns operation to point A, the READY state.

It has been mentioned that in the event of a failed test, operation proceeds to point D. This causes execution of block 260 which opens the fail-safe contactor 69 and disables the scanner 52. Operation then proceeds to block 262 which generates an "out of service" message on display 58.

Figure 4:
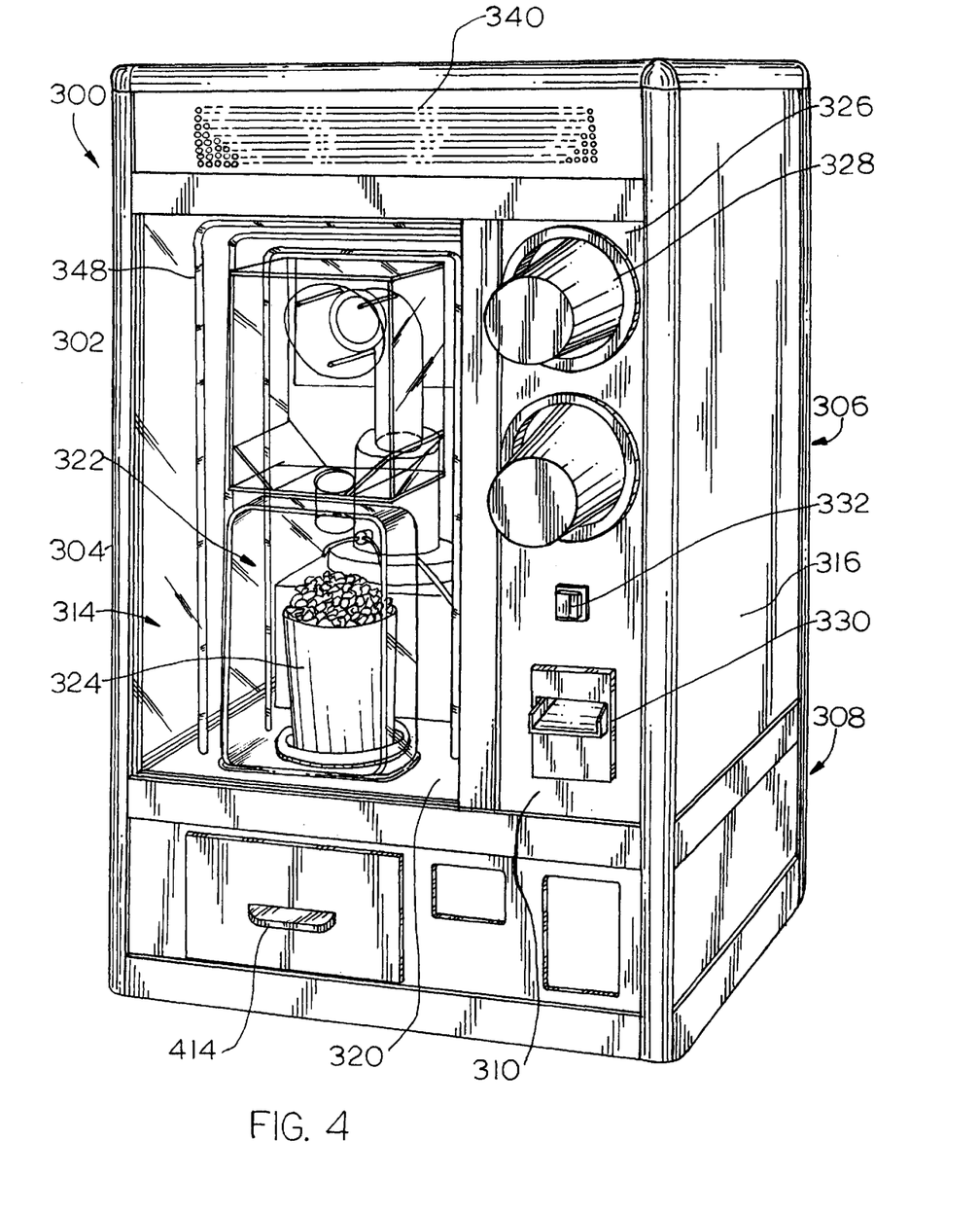
FIG. 4 is an isometric view illustrating the external appearance of a preferred structural embodiment of a popcorn machine in accordance with the present invention.
Figure 5:
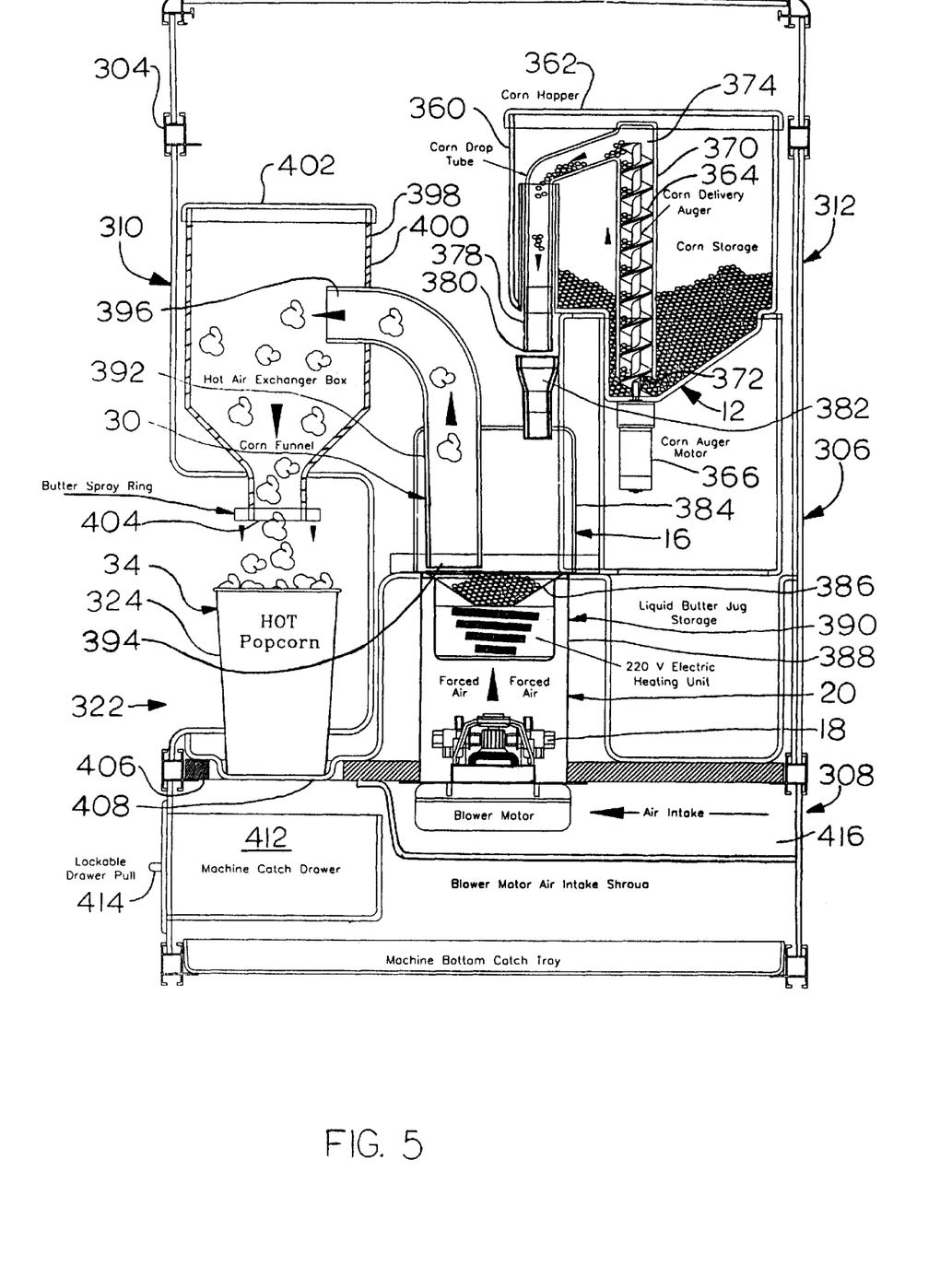
FIG. 5 is a vertical sectional view through the machine of FIG. 4 illustrating the primary structural elements of a preferred embodiment of the invention.

Attention is now directed to FIGS. 4 and 5 which depict a preferred structural embodiment of a popcorn machine 300 in accordance with the present invention. The machine 300 includes a housing 302 defined by a rectilinear frame 304. The frame 304 defines an upper section 306 which, as will be seen, houses most of the aforediscussed functional elements of the invention and a lower section 308 which is primarily used for storage, waste collection, and cooling, as will be discussed.

The frame 304 in the upper section 306 defines front and rear open areas, 310 and 312 respectively, and left and right open areas 314 and 316 respectively.

The front open area 310 is generally filled by a transparent panel 320 defining an open area 322 through which a user is able to insert a cup 324 for filling. The open area 310 also defines a solid panel portion 326 having openings 328 therein for storing unused cups for use by a user. The solid panel portion 326 also supports the coin/currency scanner 52 which is accessible to the user at 330 and the butter switch 62 accessible to the user at 332. The front open area 310 also preferably supports the alphanumeric message display device 58 which is visible to the user at 340. Preferably, the display 58 is capable of displaying dynamic multi color messages.

The housing rear open area 312 and right open area 316 are preferably closed by removable opaque panels. The left open area 314 is preferably closed by a transparent panel. Thus a user is able to observe the interior of the housing through the open areas 310 and 314, and will be able to watch the preparation of a popcorn portion. In addition to the functional elements mounted within the housing 302, aesthetic elements such as colored neon tubes 348 are preferably mounted within the housing adjacent to the transparent panels of the front and left open areas 310, 314 to enhance the entertainment value and eye-catching appeal of the unit.

FIG. 5 is a cross section of the housing and depicts the functional elements of FIG. 1 mounted therein. Thus, the housing includes the hard kernel reservoir 12 preferably formed of transparent walls 360 and having a lid 362 removable for filling. An auger 364, forming the aforediscussed kernel delivery device 14, is mounted on the shaft of motor 366. The auger 364 passes through open tube 370 extending from below the tube entrance at 372 to the tube discharge end at 374. Thus, as the auger 364 rotates, its deep helical thread 365 picks up kernels at its lower end below the tube entrance 372 and carries them upwardly through the tube 370 for discharge at 374 into tube 378. Tube 378 discharges at 380 into the funnel entrance 382 of the cooking chamber 16 preferably defined by transparent wall 384. Mounted within the cooking chamber 16 is a pan or skillet 386 having holes. Thus, the hard kernels delivered by the auger 364 to the cooking chamber via tube 378 are deposited onto the skillet 386. The skillet 386 is mounted above the heat chamber 20 defined by wall 390 and communicates therewith via holes in the heat chamber 20. A blower/motor 18 is mounted in the air manifold 388 in close proximity to the heater 22. Thus, the blower and heater generate a heated air flow, as has been discussed, which passes through openings in the heat chamber 20 into the cooking chamber 16. This causes the deposited hard kernels to pop and to be carried by the air flow into output chute 30 defined by transparent wall 392. The chute 30 includes an entrance 394 located proximate to the skillet 386 and an exit 396 which empties into a funnel shaped popcorn separation chamber 398. The separation chamber 398 is preferably formed by a transparent wall 400 and accommodates a removable lid 402 above a discharge opening 404. The discharge opening 404 is aligned with the aforementioned opening 322 and transparent panel 320 which accommodates the output container or cup 324. The floor 406 of the housing upper section 306 is preferably formed with a recess 408 below the discharge opening 404 to accommodate the cup 324. The floor of the recess 408 includes openings which communicate with a drawer 412 for collecting kernels purged from the cooking chamber after removal of the cup 324. The drawer 412 can be removed via handle 414 to empty its waste content. A butter ring 417 is mechanically connected around opening 404. Silicone tube 42 is attached to the butter ring 417 by which the pressurized butter flavoring 38 is sprayed into the cup 324.

From the foregoing, it should now be appreciated that an apparatus has been disclosed herein for preparing popcorn in a manner such that it is particularly suited for use as a vending machine in a low maintenance environment. It is contemplated that the machine can function in an essentially unattended mode to dispense one-hundred or more popcorn portions without replenishing the kernel inventory. Although a specific embodiment of the invention has been disclosed herein, it should be understood that innumerable modifications and variations may occur to those skilled in the art falling within the intended scope of the invention as defined by the accompanying claims.

What is claimed is:

1. Apparatus for preparing popcorn comprising:

a cooking chamber;

a heater;

a blower actuatable to deliver a heated air flow to said cooking chamber;

a control system for controlling the flow rate and temperature of said airflow delivered to said cooking chamber, said control system including a microprocessor based controller for defining operating parameters including an air flow setpoint;

an air flow sensor; and wherein said controller is responsive to said air flow sensor for controlling the flow rate of said heated air flow to conform to said air flow setpoint.

2. The apparatus of claim 1 wherein said operating parameters further include:

an air temperature setpoint;

a temperature sensor; and wherein said controller is further responsive to said temperature sensor for controlling the flow rate and temperature of said heated air flow to conform to said air flow and air temperature setpoints.

3. The apparatus of claim 2 further including a kernel delivery device actuatable to deliver a quantity of hard corn kernels to said cooking chamber.

4. The apparatus of claim 2 further including a popcorn output chute having an entrance located proximate to said cooking chamber; and wherein said air flow is directed to blow popped kernels from said cooking chamber into said chute entrance.

5. The apparatus of claim 4 wherein said chute has an exit; and means for supporting an output container proximate to said chute exit.

6. The apparatus of claim 4 further including a sensor for counting popped kernels entering said chute entrance.

7. The apparatus of claim 4 including actuatable means for dispensing flavoring; and wherein said controller is coupled to said dispensing means for selectively controlling actuation thereof.

8. The apparatus of claim 3 wherein said controller is coupled to said kernel delivery device for selectively controlling actuation thereof.

9. The apparatus of claim 3 wherein said control system defines an operational cycle including a preheat phase, a kernel delivery phase and a cooking phase.

10. The apparatus of claim 9 wherein said control system defines an air flow profile of diminishing magnitude during said cooking phase.

11. The apparatus of claim 9 wherein said operational cycle further includes a purge phase; and means for actuating said blower during said purge phase to remove hard kernels from said cooking chamber.

12. A method of preparing popcorn comprising the steps of:

delivering a quantity of hard corn kernels into a cooking chamber;

providing a heat source;

producing a flow of heated air to said cooking chamber to pop said kernels and blow popped kernels along an output path;

defining a desired air flow setpoint;

sensing the actual air flow rate; and controlling the produced air flow to conform the sensed air flow rate to the air flow setpoint.

13. The method claim 12 further including:

defining an air temperature setpoint;

sensing the actual temperature of said heated air flow; and controlling the temperature of said heated airflow to conform to said air temperature setpoint.

* * * * *